US00RE36378E

United States Patent [19]

Mellette

[11] E Patent Number: Re. 36,378

[45] Reissued Date of Patent: Nov. 9, 1999

[54] HIGH VOLUME LOW PRESSURE AIR SPRAY GUN

[75] Inventor: Robert R. Mellette, Nederland, Colo.

[73] Assignee: Binks Manufacturing Company, Franklin Park, Ill.

[21] Appl. No.: 08/507,687

[22] Filed: Jul. 25, 1995

Related U.S. Patent Documents

Reissue of:

[64] Patent No.: 5,064,119
Issued: Nov. 12, 1991
Appl. No.: 07/668,732
Filed: Mar. 12, 1991

U.S. Applications:

[63] Continuation of application No. 08/152,835, Nov. 12, 1993, abandoned, which is a continuation of application No. 07/529,498, May 22, 1990, abandoned, which is a continuation of application No. 07/306,517, Feb. 3, 1989, abandoned.

[51] Int. Cl.[6] ..... B05B 1/02

[52] U.S. Cl. ..... 239/8; 239/300; 239/414

[58] Field of Search ..... 239/8, 11, 61, 239/290, 296, 297, 300, 365, 367, 413, 414, 416.2, 417.3, 526

[56] References Cited

U.S. PATENT DOCUMENTS

| | | | |
|---|---|---|---|
| 1,982,055 | 11/1934 | Jenkins . | |
| 2,082,060 | 6/1937 | Jenkins . | |
| 2,082,061 | 6/1937 | Jenkins . | |
| 2,102,303 | 12/1937 | Bramsen et al. | 239/300 |
| 2,281,666 | 5/1942 | Bramsen et al. | 239/300 |
| 2,470,718 | 5/1949 | Peeps | 239/300 |
| 2,880,940 | 4/1959 | Briggs | 239/290 X |
| 3,687,368 | 8/1972 | Geberth, Jr. . | |
| 4,744,518 | 5/1988 | Toth | 239/297 |
| 4,759,502 | 7/1988 | Pomponi, Jr. et al. | 239/8 |
| 4,817,872 | 4/1989 | Mattson . | |
| 4,993,642 | 2/1991 | Hufgard | 230/526 X |
| 5,078,322 | 1/1992 | Torntore | 239/367 X |

FOREIGN PATENT DOCUMENTS

| | | | |
|---|---|---|---|
| 0766088 | 1/1957 | United Kingdom | 239/290 |

*Primary Examiner*—Andres Kashnikow
*Assistant Examiner*—Lisa Ann Douglas
*Attorney, Agent, or Firm*—Wallenstein & Wagner, Ltd.

[57] ABSTRACT

A high volume low pressure air spray gun has an atomizing air orifice for atomizing a stream of liquid coating material into a conical spray and opposed side port air orifices for flattening the spray into a fan-shaped pattern. The gun receives air at pressures up to about 100 psi, and an air flow restriction in the form of a venturi is in an air supply passage in the gun barrel. A valve stem for controlling the flow rate of air to the side port orifices extends through the venturi, and is configured to vary the venturi air flow area in response to changes in the flow rate of air to the side port orifices. When the valve stem is positioned for maximum air flow to the side port orifices, it establishes a maximum air flow area through the venturi, such that a high pressure of air at the gun air inlet, after flowing through the venturi, results in a high volume low pressure air flow at the atomizing and side port orifices. When the valve stem is positioned to reduce air flow to the side port orifices, it correspondingly reduces the flow area through the venturi to maintain the pressure of air at the atomizing orifice below a selected maximum value. The gun may carry a paint cup, in which case the cup is pressurized by air downstream from the venturi to prevent overpressurization of the cup.

9 Claims, 3 Drawing Sheets

HIGH VOLUME LOW PRESSURE AIR SPRAY GUN

Matter enclosed in heavy brackets [ ] appears in the original patent but forms no part of this reissue specification; matter printed in italics indicates the additions made by reissue.

This is *a continuation of application Ser. No. 08/152,835 filed on Nov. 12, 1993, now abandoned, which* is a continuation of application(s) Ser. No. 07/529,498 filed on May 22, 1990, now abandoned which in turn is a continuation of U.S. Ser. No. 07/306,517 filed Feb. 3, 1989, now abandoned.

BACKGROUND OF THE INVENTION

The present invention relates to a high volume low pressure air spray gun, in which air having a relatively high flow rate and a relatively low delivery pressure is used to atomize liquid coating material into a conical spray and to selectively form the spray into a fan-shaped pattern.

To decrease the cost of coating material used in spray coating processes and for environmental considerations, there has been a trend toward spray coating equipment having a high transfer efficiency. Transfer efficiency is the amount of coating solids applied onto a target versus the amount of coating solids sprayed, expressed as a percentage. To increase transfer efficiency, the velocity of the coating particles should advantageously be fairly slow in order to avoid blow-by which occurs when spray particles miss the target, with excessive velocity of the particles actually causing some of them that strike the target to bounce off of it. Greatest transfer efficiency is usually achieved in systems offering optimum atomization coupled with the lowest possible velocity of the particles.

Conventional air spray guns have a relatively low transfer efficiency. Air delivered to their spray heads has relatively high pressure, and as it exits the spray head it atomizes a stream of liquid coating material into a conically-shaped spray, which usually is flattened into a fan-shaped pattern by opposed side port air jets. When the high pressure air exits the spray head, it expands and imparts a relatively high velocity and fogging effect to the spray particles, causing a large percentage of the particles to miss the target.

Airless spray systems have a somewhat higher transfer efficiency. With such systems, coating liquid is hydraulically forced through a specially shaped orifice at pressures on the order of 500–4500 psi, which causes the coating to be emitted in an unstable thin film that interacts with atmospheric air and breaks up into an atomized spray at its forward edge. These systems develop spray particles that have a lower velocity and exhibit less fogging than occurs with conventional air spray guns.

A more recent development is the air-assisted airless system which utilizes both airless and air atomization. Coating liquid is supplied to a specially shaped orifice at hydraulic pressures less than those normally encountered in purely airless systems, usually on the order of 300–1000 psi. This causes the material to be atomized into a spray, but the degree of atomization is not as satisfactory as obtained with conventional airless or air spray guns. To improve atomization, an air-assist is applied to the spray pattern, enhancing the atomization process and doing away with tails that would mar the finish. The transfer efficiency of air-assisted airless systems is greater than those of conventional airless or air spray systems.

Recently, high volume low pressure (HVLP) spray systems have found increasing use because of their high transfer efficiency. These systems utilize air to atomize a stream of coating material, but at the spray head the air has a relatively high flow rate, usually well in excess of 5 CFM, and a relatively low delivery pressure, usually less than 15 psi. The high volume and low pressure of the air results in decreased fogging and an increased percentage of the spray particles striking and adhering to the target.

Many HVLP spray guns use a turbine to supply air at high volume and low pressure to an inlet to the gun, from which it passes through enlarged air passages to the spray head. A significant disadvantage is that a separate turbine for supply of air is required, which increases the cost and complexity of the system.

Other types of HVLP spray guns, such as the one disclosed in U.S. Pat. No. 3,796,376 to Farnsteiner, receive high pressure factory air at their inlets. Such guns have a venturi in their handle air passage, downstream of the air inlet, to reduce the pressure and increase the volume flow of air into the gun body. To further increase the volume flow of air into the gun, in the spray gun of U.S. Pat. No. 3,796,376, passages are in the handle for admitting atmospheric air by the action of the compressed air passing through the venturi. From the venturi air then passes, at a reduced pressure and increased volume, through passages in the gun body to the spray head. Another HVLP spray gun is disclosed in U.S. Pat. No. 4,761,299 to Hufstetler.

It is desirable with HVLP spray guns to be able to control the shape of the spray pattern, i.e., so that the conically diverging atomized spray may selectively be shaped between conical and flat fan by means of controlling the flow rate of side port air emitted against opposite sides of the spray. Control of side port (fan-shaping) air is also critical to producing the best atomization and "flow-out" of material on the coated surface to allow the best possible surface finish. Many such guns, however, do not provide for control over side port air, and in others that do no provision is made to prevent an undesirable increase in the pressure of air at the atomizing orifice as the air flow to the side ports is reduced. Also, HVLP spray guns, when used with a paint cup, require pressure feed since they cannot siphon paint from the cup, but the various means heretofore used to pressurize the cups have generally been less than satisfactory.

Although some prior HVLP spray guns, such as the one of said U.S. Pat. No. 4,761,299, develop at the spray head a relatively low pressure of air on the order of 15 psi or less, it has recently become desirable to limit the maximum pressure at the atomizing and side port orifices to 10 psi or less. This has occurred because of environmental considerations, since HVLP spray guns that are limited to an air pressure of 10 psi or less at the spray head inherently have a high transfer efficiency. As a result, certain environmental protection agencies, such as those in California, which otherwise would require as a condition for use of a spray gun that it be tested to meet at least a specified minimum transfer efficiency, now automatically exempt a gun if the pressure of air at its spray head is 10 psi or less.

OBJECTS OF THE INVENTION

An object of the invention is to provide an improved HVLP spray gun, which utilizes at its spray head air having a relatively low pressure and a relatively high volume flow rate to atomize liquid coating material.

A further object is to provide such a spray gun, which is adapted to be supplied with air at a pressure of up to about 100 psi, yet limits the pressure of air at the spray head to 10 psi or less.

Another object is to provide such a spray gun, in which the flow rate of side port air at the spray head is adjustable to vary the spray pattern from round to flat fan.

A still further object is to provide such a spray gun in which, upon a reduction in the flow rate of side port air, there is a corresponding reduction in the overall flow rate of air to the spray head to prevent an increase in the pressure of atomizing air.

Yet another object is to provide such a spray gun, which is adapted for pressure cup operation without danger of overpressurizing the cup.

SUMMARY OF THE INVENTION

In accordance with the present invention, a method of spraying liquid coating material comprises the steps of providing liquid coating material to a fluid orifice in a spray head, supplying air to the spray head, and delivering air supplied to the spray head to an atomizing air orifice in the spray head to atomize coating material into a spray and to side port air orifices in the spray head for impingement against and to shape the spray. Also included are the steps of adjusting the volume flow rate of air delivered to the side port orifices to vary the shape of the spray and, in response to and concurrently with performance of the adjusting step, controlling the volume flow rate of air supplied to the spray head in accordance with the volume flow rate of air delivered to the side port orifices.

The invention also contemplates an apparatus for spray coating, which comprises a spray head having a fluid orifice, and atomizing air orifice and an inlet thereto, and side port orifices and an inlet thereto. Included are means for providing liquid coating material to the fluid orifice, and means for supplying air to the spray head inlets for delivery to and flow through the atomizing air orifice to atomize coating liquid into a spray and for delivery to and flow through the side port orifices for impingement against and to shape the spray. Also, there is means for adjusting the volume flow rate of air delivered to the side port orifices to vary the shape of the spray and means, responsive to operation of the adjusting means, for concurrently controlling the volume flow rate of air supplied to the spray head inlets in accordance with the volume flow rate of air delivered to the side port orifices.

The foregoing and other objects, advantages and features of the invention will become apparent upon a consideration of the following detailed description, when taken in conjunction with the accompanying drawings.

DETAILED DESCRIPTION

Figure 1:
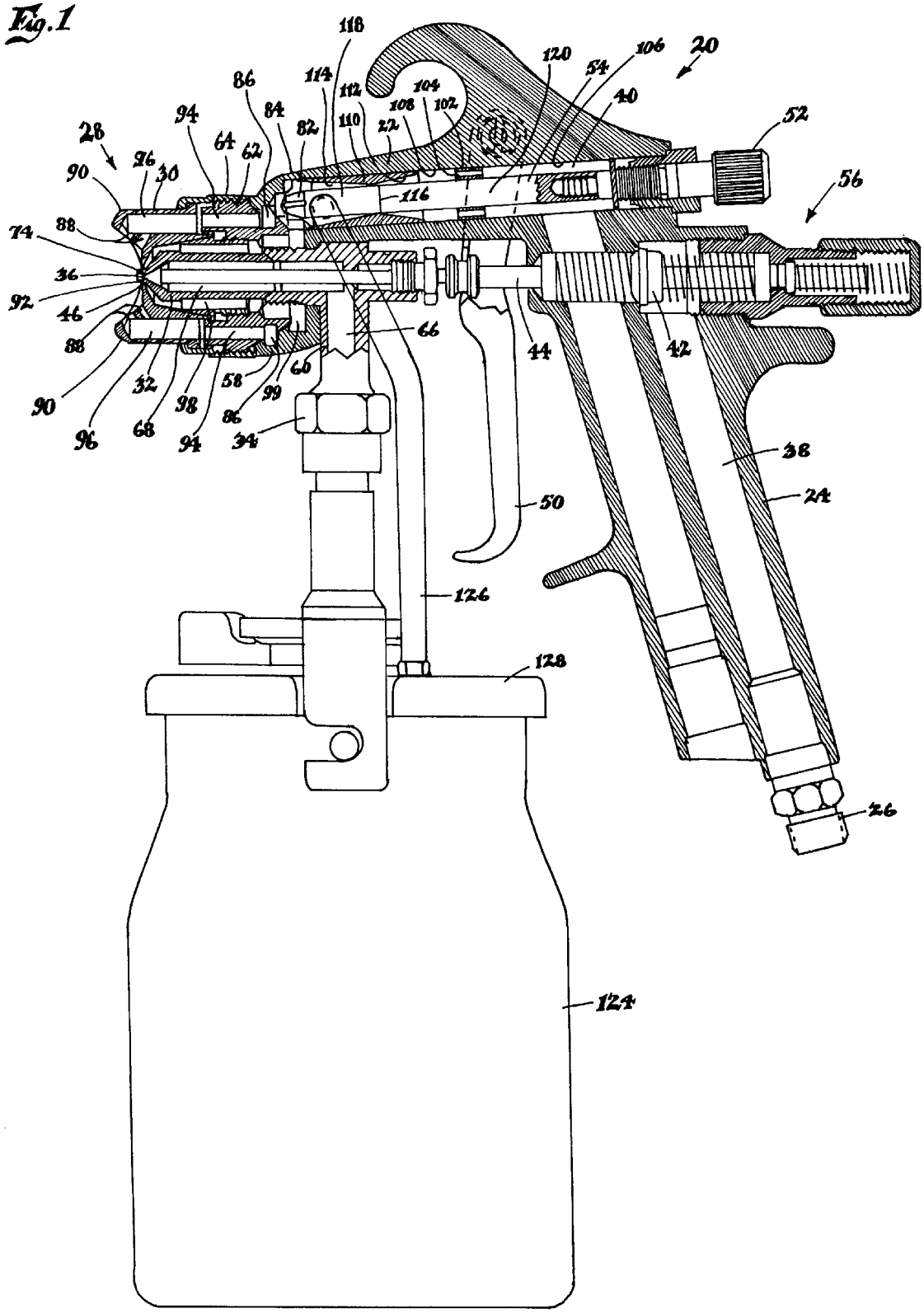
FIG. 1 is a side elevation view, partly in cross section, illustrating an HVLP spray gun constructed in accordance with the teachings of the invention.
Figure 2:
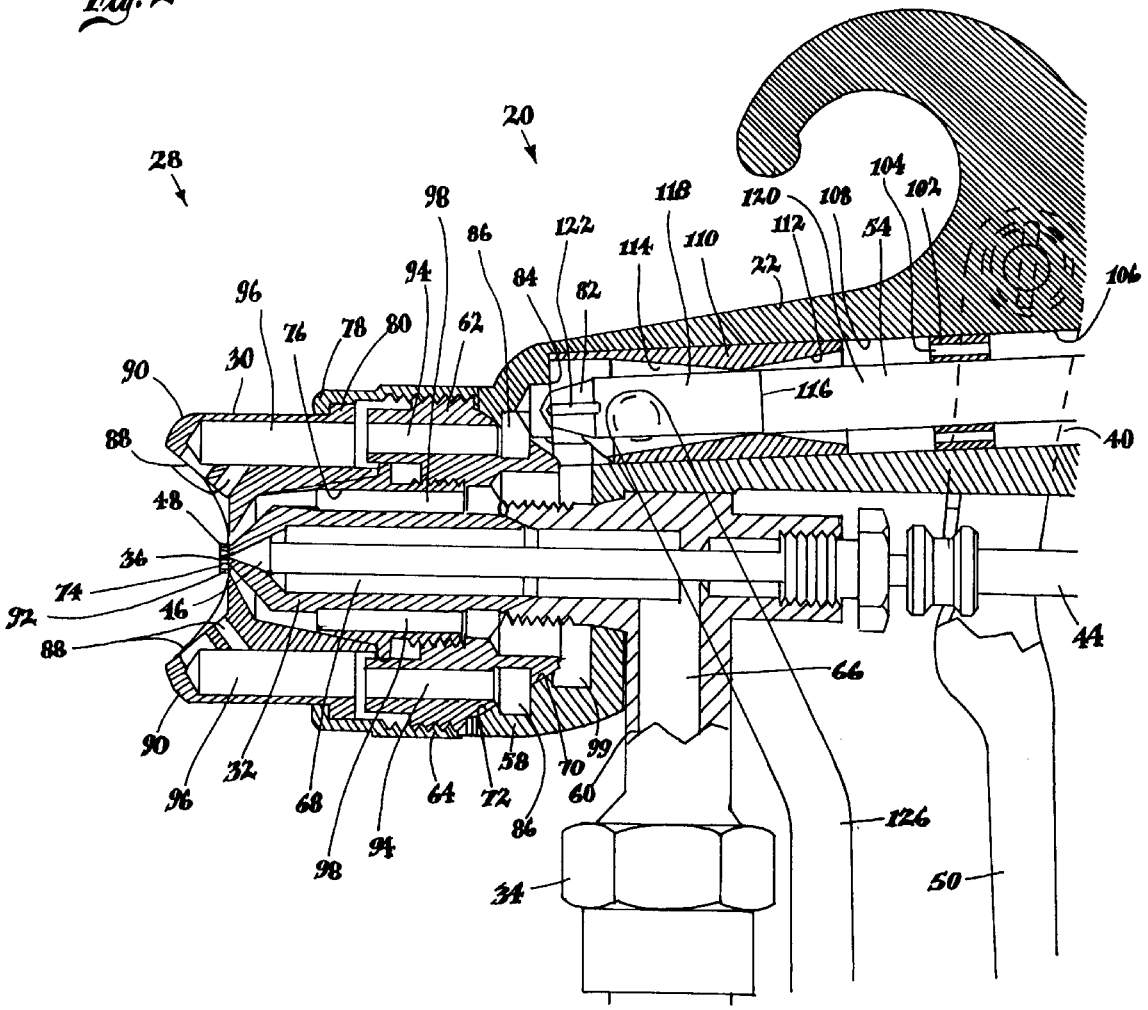
FIG. 2 is an enlarged, cross sectional side elevation view of the forward end of the spray gun in FIG. 1.
Figure 3:
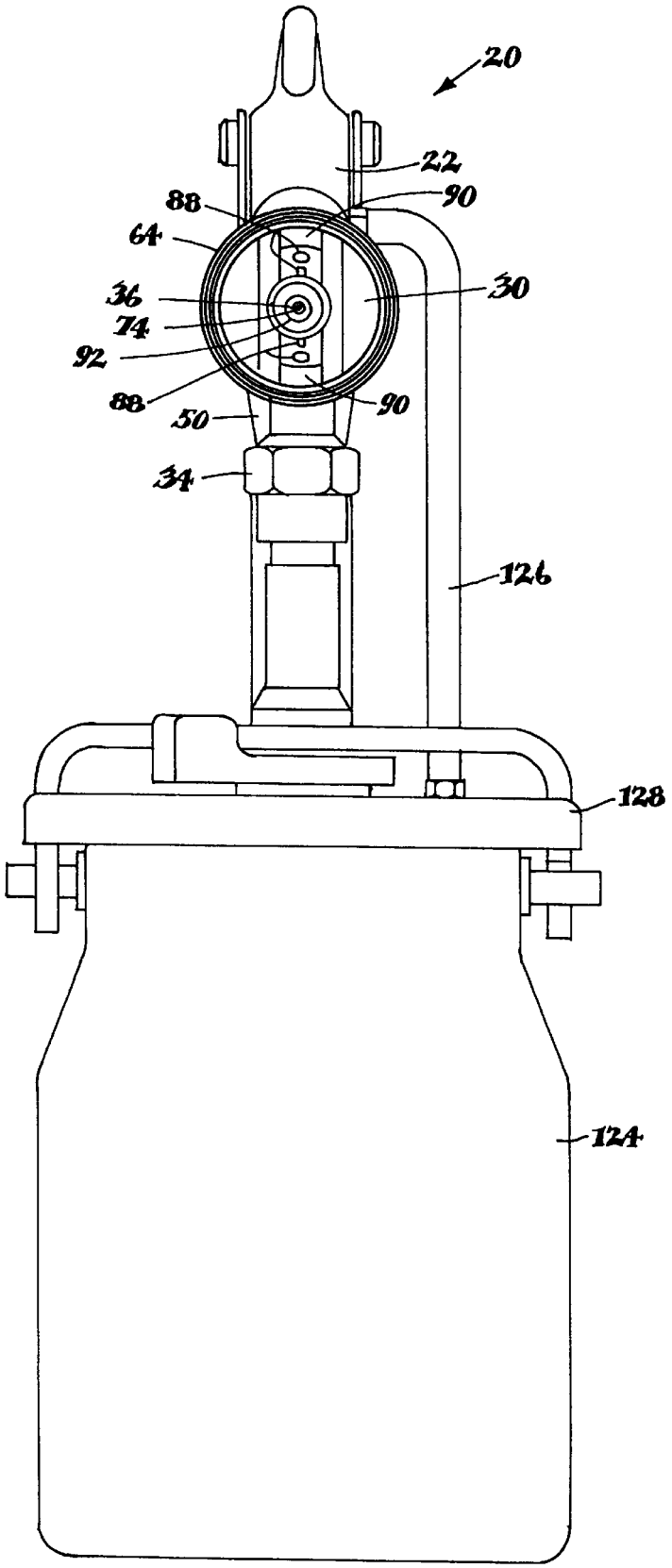
FIG. 3 is a front elevation view of the spray gun.

The drawings illustrate a high volume low pressure (HVLP) spray gun assembly, indicated generally at 20, which includes a spray gun body 22 having a handle 24 and a fitting 26 at the handle lower end for connection with a source of compressed air that may be at a pressure of up to about 100 psi. At its forward end the gun has a spray head assembly, indicated generally at 28, which includes an air nozzle 30 and a fluid nozzle 32 through which liquid coating material supplied to the gun through a fitting 34 flows to an outlet orifice 36 for being atomized into a spray by jets of air emitted from the air nozzle. An air passage 38 extends through the handle, and is placed in communication with a gun barrel air passage 40 by opening an air valve means 42. A fluid valve stem 44 is connected to the air valve means, and extends through the fluid nozzle 32 to a forward tapered end 46 that forms a valve with a seat 48 in the fluid nozzle behind the orifice 36.

To control spraying, the air valve means 42 is movable between closed and open positions to control a flow of pressurized air from the handle passage 38 and through the body passage 40 to the air nozzle 30, and the fluid valve stem 44 is movable between closed and open positions to control a flow of fluid through the fluid nozzle orifice 36. For the purpose, a manually manipulatable trigger 50 is operatively connected to the fluid valve stem and pivotally connected to the gun body. The trigger is movable between a gun off position away from the handle, at which the air valve means and fluid valve stem are in their closed positions, to a gun on position toward the handle, at which the air valve means and fluid valve stem are moved to their open positions for generating a spray of atomized coating material. An air control knob 52 connects to an air valve stem 54 extending through the gun barrel air passage 40, and adjustment of the knob determines the flow rate of side port air emitted from opposite sides of the air nozzle 30 when the gun is on. A fluid valve stem adjustment means, indicated generally at 56, determines the dispensing rate of coating material when the gun is on.

The spray head assembly 28 mounts on a downwardly depending annular extension 58 at a forward end of the gun barrel 22. The spray head assembly comprises the air nozzle 30 and a fluid inlet fitting 60, together with the fluid nozzle 32, a fluid nozzle retainer 62 and an air nozzle retainer 64. The fluid inlet fitting and fluid nozzle have respective fluid passages 66 and 68.

The inlet fitting 60 is generally L-shaped and the annular extension 58 has a passage longitudinally therethrough which has a relatively small diameter at its rearward end and increases in diameter toward its forward end where it defines two tapered annular shoulders 70 and 72. The upper horizontal leg of the inlet fitting has external threads at its forward end and extends through the passage into threaded connection with internal threads in the fluid nozzle retainer 62 to mount the inlet fitting and fluid nozzle retainer on the forward end of the gun barrel. When the inlet fitting and fluid nozzle retainer are tightened together, a pair of tapered shoulders on the fluid nozzle retainer abut and seal with the tapered shoulders 70 and 72.

The fluid nozzle 32 is threaded into the fluid nozzle retainer 62, until an outer tapered seat at a rearward end of the fluid nozzle moves against and seals with a tapered seat at the forward end of the inlet fitting passage 66. This mounts the inlet fitting, fluid nozzle retainer and fluid nozzle on the annular extension 58 and establishes a leak-proof path through the fluid passages 66 and 68.

To complete the spray head assembly 28, the air nozzle 30 is placed over the forward end of the fluid nozzle 32 to extend an outer end 74 of the fluid nozzle into a passage formed centrally through a front wall of the air nozzle and until an annular tapered shoulder 76 on the air nozzle seats against an associated annular tapered shoulder on the fluid nozzle. The air nozzle retainer 64 is then placed around the air nozzle and threaded onto the fluid nozzle retainer 62, until a radially inwardly extending annular flange 78 on the air nozzle retainer engages a radially outwardly extending annular flange 80 on the air nozzle and moves the air nozzle tightly against the fluid nozzle.

To provide atomizing air to the spray head assembly 28, the gun barrel passage 40 receives air from the handle passage 38 upon opening the air valve means 42. The air valve stem 54 extends through the barrel passage to a forward tapered end 82 of the stem that is movable against and away from a side port air valve seat 84 at a forward end of the barrel passage. The position of the air valve stem with respect to its seat is determined by the setting of the side port air control knob 52. When the air valve stem is retracted from its seat, it opens communication between the barrel passage 40 and an annular chamber 86 in the barrel extension 58, which chamber communicates with spray pattern forming side port air orifices 88 in opposed ears 90 of the air nozzle 30 through passages 94 in the fluid nozzle retainer 62 and passages 96 in the air nozzle ears. An annular atomizing air outlet orifice 92 is defined between the forward end 74 of the fluid nozzle 32 and the passage through the front face of the air nozzle. To supply air to the atomizing air orifice 92, passages 98 extend through the fluid nozzle between an annular chamber 99 and the orifice. Triggering the gun on therefore causes air to be emitted to atomize dispensed liquid coating material into a conical spray and to form the spray into a fan-shaped pattern.

To control dispensing of liquid coating material, the fluid valve stem 44 extends through the rearward end of the fluid inlet fitting 60 and then through the fluid passages 66 and 68 to its forward tapered end 46 at the fluid nozzle seat 48. Operation of the trigger 50 to turn on the gun retracts the tapered end from its seat for a flow of fluid from the orifice 36 in the fluid nozzle forward end 74, whereupon fluid is emitted in a cylindrical stream that is atomized into a spray by air emitted from the air nozzle 30.

To the extent described, the spray gun is substantially identical to the one in Culbertson et al U.S. Pat. No. 4,537,357, issued Aug. 27, 1985 to the assignee of the present invention, the teachings of which are incorporated herein by reference. A difference, however, resides in the sizes or air flow areas of the air nozzle air passages 96, the fluid nozzle air passages 98, the side port air outlet orifices 88, the annular atomizing air outlet orifice 92 and the air valve stem seat 84. As compared with those in the spray gun of said Culbertson et al patent, in the present gun they are relatively large in cross sectional flow area to accomodate emission of a high volume flow of air at a low pressure.

Unlike most HVLP spray guns that require a separate turbine for supply of air at a relatively high volume and low pressure, the one of the invention is particularly adapted to receive air from a conventional compressed air supply at pressures up to about 100 psi. The gun may therefore be incorporated into existing spraying systems where there already is a factory air supply, without need to purchase and install a separate air supply turbine. A further advantage is that an air supply line from a turbine is necessarily large and bulky to accomodate the large volume flow of air at low pressure, which makes a spray gun to which it is connected unwieldy to handle, whereas the present gun retains its maneuverability when connected to a conventional high pressure air supply line.

The spray gun 20 is configured so that with about 100 psi of air at its inlet 26, when the gun is triggered on a high volume flow of air is delivered to the spray head assembly at a low pressure approximately equal to but no greater than 10 psi. For lower air inlet pressures, such as 40–60 psi, the high volume air flow delivered to the spray head will be at a lower pressure, but because of the high air flow rate, coating material will be properly atomized. The air control knob 52 controls the volume flow rate of air to the side port orifices 88, and to prevent excessive air pressure from being developed at the atomizing air orifice 92 as the flow rate of air to the side port orifices is decreased, means are provided to decrease the volume flow rate of air to the spray head assembly 28 in response to and in accordance with a decrease in the flow rate of air to the side port orifices. The spray gun is adapted to receive coating material from a pressure cup carried by the gun, and its structure accommodates convenient pressurization of the cup, from air in the gun, without overpressurizing the cup.

The structure of the HVLP spray gun 20, that accommodates conversion of high pressure low volume air at the inlet 26 to high volume low pressure air at the spray head assembly 28, includes a guide bushing 102 in the gun barrel air passage 40, through which the air valve stem 54 extends. The air valve stem is longitudinally movable within the bushing by the air control knob 52, and a plurality of equally circumferentially spaced passages 104 extend longitudinally through the bushing. The bushing divides the barrel passage into a rearward portion 106 upstream from and a middle portion 108 downstream from the bushing. When the gun is triggered on to open the air valve means 42, high pressure air flows from the handle passage 38 into the rearward passage portion, and then through the bushing passages to the middle passage portion.

A restriction to the flow of air to the spray head assembly 28 is downstream from the bushing 102 and comprises a variable flow area restriction which, in the disclosed embodiment, is in the form of a variable flow area venturi 110 through which the air valve stem 54 extends. With reference to the direction of air flow, the venturi, which may be a sonic venturi, has a tapered converging rearward passage portion 112 and a tapered diverging forward passage portion 114. A tapered shoulder 116 on the air valve stem is positioned within the venturi, and defines a juncture between a first diameter forward end 118 of the stem and a second and greater diameter rearward end 120. In a contemplated embodiment, the diameter of the forward end 118 is 0.250", the diameter of the rearward end 120 is 0.264", the shoulder 116 is tapered at about 15°, with respect to the stem axis, between the forward and rearward ends, and the minimum necked down diameter of the venturi passage, between the passage portions 112 and 114, is 0.278 inch. When the tapered end 82 of the air valve stem is fully retracted from its seat 84 for a maximum volume flow of air to the side port orifices 88, the tapered shoulder 116 is rearwardly of and the forward reduced diameter end 118 of the stem extends through the necked down portion of the venturi passage, so the air flow area of and volume flow rate of air through the venturi are at a maximum. On the other hand, when the tapered end of the stem is moved toward and against its seat to reduce the volume flow of air to the side port orifices, the tapered shoulder 116 and the increased diameter rearward end 120 of the stem are moved into the necked down portion of the venturi passage, under which condition the air flow area of and volume flow rate of air through the venturi are at a minimum. In the process of moving the tapered end of the air valve stem from its most retracted position to against its seat, as the tapered shoulder 116 advances toward and then into the necked down portion of the venturi passage, the flow area through the passage progressively decreases. The valve stem and venturi member 110 therefore define a variable flow area restriction or venturi, and air entering the venturi at a low volume and high pressure exits it at a high volume and low pressure.

With about 100 psi air at the gun inlet 26 and the air valve stem 54 fully retracted to maximize the air flow to the side port orifices 88, the passage through the venturi-shaped restriction 110 has a maximum air flow area for delivery of a maximum volume flow of low pressure air to the spray head assembly 28, and the air in the spray head assembly, just upstream from the side port and atomizing air orifices, has a high volume flow rate of at least 5 CFM and a low pressure of about, but no greater than, 10 psi. Under this condition, with a maximum air flow delivered from the side port orifices, the conically shaped atomized coating spray formed by air from the atomizing air orifice is flattened into a fan-shaped pattern.

The spray pattern can be changed from a flat fan to round, and anywhere in between, by moving the tapered end 82 of the air valve stem toward and/or against its seat 84 to reduce the air flow to the side port orifices 88. If the air valve stem were of constant diameter, reducing the air flow to the side port orifices would result in an increasing portion of the air supplied to the spray head assembly being delivered to the atomizing air orifice, and there would be an increase in the pressure of air upstream from the atomizing air orifice, possibly beyond the desirable 10 psi maximum. However, because of the tapered shoulder 116 of the air valve stem and the increased diameter of the stem rearwardly of the shoulder, as the stem moves forwardly the air flow area through the venturi passage is progressively reduced to decrease the volume flow of air supplied to the spray head and prevent an increase in pressure of the atomizing air beyond 10 psi.

To prevent an excessive increase in pressure of air in the downstream venturi passage portion 114 when the tapered end 82 of the air valve stem 54 is moved fully against its seat, a plurality of air conveying longitudinal slots 122 are formed in and at circumferentially spaced intervals around the tapered end. Consequently, even when the air valve stem is fully closed, some air still flows to the side port orifices 88, but not enough to cause appreciable flattening of the spray. The reason for limiting the pressure of air in the venturi passage portion 114 is because it is from there that air for pressurizing a paint cup 124 is obtained. Because of the relatively low velocity of the air flow on the downstream side of the venture, paint cannot be delivered from the cup into the spray gun 20 by siphoning. Paint must therefore be pressure fed into the gun, and for the purpose an air line 126 extends between the venturi passage portion 114 and an opening in a cup lid 128. Limiting the pressure developed in the venturi passage portion 114 thereby prevents overpressurization of the cup. A check valve (not shown) in the cup lid opening prevents loss of cup pressure when the gun is turned off and provides for even flow of coating material to the fluid nozzle.

While one embodiment of the invention has been described in detail, various modifications and other embodiments thereof may be devised by one skilled in the art without departing from the spirit and scope of the invention, as defined in the appended claims.

What is claimed is:

1. A method of spraying liquid coating material, comprising the steps of [providing] *delivering* liquid coating material to a fluid orifice in a spray head *at a substantially constant flow rate*; supplying air to an air supply passage for the spray head; delivering air *at low pressure and high volume* from the air supply passage to an atomizing air orifice in the spray head to atomize the coating material into a spray; selectively delivering air from the air supply passage to side port air orifices in the spray head for impingement against and to shape the spray; adjusting the volume flow rate of air delivered to the side port orifices *without varying the flow rate of the coating material* to vary the shape of the spray; and, in response to and concurrently with performance of said adjusting step, correspondingly adjustably controlling the volume flow rate of air through the air supply passage in accordance with the volume flow rate of air delivered to the side port orifices for maintaining substantially constant the volume flow rate and pressure of air delivered to the atomizing air orifice.

[2. A method as in claim 1, wherein said adjusting and correspondingly adjustably controlling steps comprise using a single valve member to simultaneously decrease and increase the volume flow rate of air through the air supply passage by an amount substantially corresponding to decreases and increases in the volume flow rate of air delivered to the side port orifices.]

3. A method as in claim 1, wherein said air supplying and delivering steps provide air at a pressure no greater than about 10 psi at the atomizing air and side port orifices, and said correspondingly adjustably controlling step decreases the volume flow rate of air through the air supply passage to prevent the pressure of air at the atomizing air orifice from exceeding 10 psi upon a decrease in the volume flow rate of air delivered to the side port orifices.

4. A method of spraying liquid coating material with a spray head having a fluid orifice, a first passageway extending between an inlet to the first passageway and an atomizing air orifice, and a second passageway extending between an inlet to the second passageway and side port orifices, comprising the steps of delivering liquid coating material to the fluid orifice; [supplying air] *forming the passageways and the air orifices of large cross-sectional flow area for accommodating passage through and emission therefrom of a high volume of low pressure air; supplying air at low pressure and high volume* through a common passageway to the inlets to the first and second passageways for delivery of air to the atomizing air orifice to atomize the coating material into a spray and to the side port orifices for impingement against and to shape the spray; adjusting the air flow area through the inlet to the second passageway to control the volume flow rate of air delivered to the side port orifices to vary the shape of the spray; and, in response to and concurrently with performance of said adjusting step, correspondingly changing the air flow area through the common passageway to control the volume flow rate of air through the common passageway [so], *said changing step so varying the rate of air flow through the first passageway* that the pressure of air at the atomizing air orifice *does not exceed a selected maximum value and* does not change significantly in response to changes in the volume flow rate of air delivered to the side port orifices.

[5. A method as in claim 4, wherein said adjusting and correspondingly changing steps comprise using a single valve member to change the air flow area through the inlet to the second passageway and to concurrently and correspondingly change the air flow area through the common passageway to prevent the pressure of air at the atomizing air orifice from exceeding a selected maximum value as a result of changes in the volume flow rate of air delivered to the side port orifices.]

6. A method as in claim 4, wherein said supplying step comprises supplying air through a restriction in the common passageway, and said correspondingly changing step comprises changing the air flow area through the restriction in response to and by an amount correlated to a change in the air flow area through the second passageway inlet*; wherein*

*the step of delivering liquid coating material comprises pressurizing a paint cup with air obtained from the common passageway on the downstream side of the restriction to flow coating material from the pressurized cup to the fluid orifice; and including the step of preventing said adjusting step from completely closing the flow area through the second passageway so that some air always flows through the second passageway inlet to limit the pressure of air in the common passageway downstream of the restriction to a value that will not overpressurize the cup.*

[7. A method as in claim 6, wherein said adjusting and correspondingly changing steps comprise using a single valve member to simultaneously vary the air flow areas through each of the second passageway inlet and the restriction.]

[8. A method as in claim 6, wherein said supplying step comprises delivering air at a high pressure and low volume to the common passageway on the upstream side of the restriction, and said correspondingly changing step comprises changing the air flow area through the restriction so that air exiting the downstream side of the restriction has, with respect to air on the upstream side, a high volume and low pressure and so that the pressure of air at the atomizing air orifice is no greater than a selected value.]

[9. A method as in claim 8, wherein the restriction is a venturi and said step of delivering liquid coating material comprises pressurizing a paint cup with air obtained from the common passageway on the downstream side of the venturi to flow coating material from the pressurized cup to the fluid orifice.]

[10. A method as in claim 9, including the step of preventing said adjusting step from completely closing the flow area through the second passageway inlet so that some air always flows through the second passageway inlet to limit the pressure of air in the common passageway downstream from the venturi to a value that will not overpressurize the cup.]

[11. A method as in claim 6, wherein said supplying step comprises delivering air at a pressure up to about 100 psi to the common passageway on the upstream side of the restriction, and said correspondingly changing step comprises changing the air flow area through the restriction so that the pressure of air at the atomizing air and side port orifices is no greater than about 10 psi, irrespective of the volume flow rate of air delivered to the side port orifices.]

12. A method of spraying liquid coating material with an apparatus having a body and a spray head carried by the body, comprising the steps of delivering liquid coating material to a fluid orifice in the spray head; supplying air at a low volume and high pressure to an inlet to a passage in the body; converting the low volume high pressure air at the inlet to the body passage to high volume low pressure air at an outlet from the passage; *providing in the spray head at and downstream from the outlet of the passage an atomizing air orifice and side port air orifices of large cross-sectional flow area for accommodating passage through and emission therefrom of the high volume low pressure air,* connecting the outlet from the passage to inlets to an atomizing air orifice and side port orifices in the spray head for flow of [high volume low pressure air] *the high volume of air at the said low pressure* through the atomizing air orifice to atomize the coating material into a spray and through the side port orifices for impingement against and to shape the spray; adjusting the flow rate of air through the inlet to the side port orifices to change the shape of the spray; and, in response to and concurrently with performance of said adjusting step, changing the flow rate of high volume low pressure air at the body passage outlet by an amount correlated to the change in the flow rate of air through the inlet to the side port orifices, so that a change in the flow rate of air through the inlet to the side port orifices does not significantly change the pressure of air at the atomizing air orifice *and prevents the pressure of air at the atomizing air orifice from exceeding a selected maximum value.*

[13. A method as in claim 12, wherein said converting step comprises flowing the low volume high pressure air through a restriction in the body passage, and said changing step comprises changing the air flow area through the restriction.]

[14. A method as in claim 12, wherein said adjusting and changing steps are performed using a single valve member for simultaneously changing the air flow areas through each of the inlet to the side port orifices and the body passage.]

[15. A method as in claim 12, wherein said converting step comprises flowing the low volume high pressure air through a restriction in the body passage, and said changing step comprises changing the resistance to a flow of air through the restriction.]

[16. A method as in claim 15, wherein said adjusting and changing steps are performed using a single valve member for simultaneously changing the air flow area through the inlet to the side port orifices and the resistance to a flow of air through the restriction.]

[17. Apparatus for spray coating, comprising a spray head having a fluid orifice, an atomizing air orifice and an inlet thereto, and side port air orifices and an inlet thereto; means for providing liquid coating material to said fluid orifice; air supply passage means for supplying air to said spray head inlets for delivery to and flow through said atomizing air orifice to atomize coating liquid into a spray and for delivery to and flow through said side port orifices for impingement against and to shape the spray; means for adjusting the volume flow rate of air delivered to said side port orifices to vary the shape of the spray; and means, responsive to operation of said adjusting means, for concurrently and correspondingly adjustably controlling the volume flow rate of air through said air supply passage means.]

[18. Apparatus as in claim 17, wherein said air supply passage means delivers air to said atomizing air and side port orifices at a pressure no greater than about 10 psi, and said correspondingly adjustably controlling means decreases the flow rate of air through said air supply passage means to prevent the pressure of air at said atomizing air orifice from exceeding 10 psi in response to said adjusting means decreasing the flow rate of air delivered to said side port orifices.]

[19. Apparatus for spray coating, comprising a spray head having a fluid orifice, a first passageway extending between an inlet to said first passageway and an atomizing air orifice, and a second passageway extending between an inlet to said second passageway and side port air orifices; means for delivering liquid coating material to said fluid orifice; means for supplying air through a common passageway to said inlets for delivery through said first passageway to said atomizing air orifice to atomize the coating material into a spray and through said second passageway to said side port orifices for impingement against and to shape the spray; means for adjusting the air flow area through said second passageway inlet to control the volume flow rate of air delivered to said side port orifices to vary the shape of the spray; and means, responsive to operation of said adjusting means, for concurrently and correspondingly changing the air flow area through said common passageway so that the pressure of air at said atomizing air orifice does not change significantly in response to changes in the volume flow rate of air delivered to said side port orifices.]

[20. Apparatus as in claim 19, including a restriction in said common passageway, said supplying means supplying air through said restriction to said spray head inlets, and said correspondingly changing means changing the air flow area through said restriction in response to operation of said adjusting means and by an amount correlated to the change in air flow area through said second passageway inlet.]

[21. Apparatus as in claim 19, including a valve member common to each of said adjusting means and said correspondingly changing means for simultaneously changing the air flow areas through each of said second passageway inlet and said common passageway.]

[22. Apparatus as in claim 20, where said restriction comprises a venturi, said supplying means delivers air at a low volume and high pressure to said common passageway on the upstream side of said venturi, and said correspondingly changing means changes the air flow area through said venturi so that air exiting the downstream side of said venturi has, with respect to air on its upstream side, a high volume and low pressure and also so that the pressure of air at said atomizing air orifice is no greater than a selected value.]

[23. Apparatus as in claim 22, wherein said delivering means includes a paint cup, and means for coupling air on the downstream side of said venturi to said paint cup to pressurize said cup for pressurized delivery of coating material to said fluid orifice.]

[24. Apparatus as in claim 23, including means for preventing said adjusting means from completely closing the air flow area through said second passageway inlet so that some air always flows through said second passageway inlet to limit the pressure of air in said common passageway on the downstream side of said venturi to prevent overpressurization of said cup.]

[25. Apparatus as in claim 20, wherein said supplying means delivers air at a pressure up to about 100 psi to said common passageway on the upstream side of said restriction, and said correspondingly changing means adjusts the air flow area through said restriction so that the pressure of air at said atomizing air and side port orifices is no greater than about 10 psi, irrespective of the volume flow rate of air delivered to said side port orifices.]

[26. Apparatus for spray coating, comprising a body having an air passage therethrough; a spray head carried by said body, said spray head having a fluid orifice, an atomizing air orifice and an inlet thereto, and side port air orifices and an inlet thereto, said inlets being coupled with an outlet from said body passage; means for delivering liquid coating material to said spray head fluid orifice; means for supplying air at a low volume and high pressure to an inlet to said body passage; means for converting the low volume high pressure air at said body passage inlet to high volume low pressure air at said body passage outlet for delivery to said spray head inlets for flow through said atomizing air orifice to atomize coating liquid into a spray and through said side port orifices for impingement against and to shape the spray; means for adjusting the volume flow rate of air through said inlet to said side port orifices to change the shape of the spray; and means, responsive to operation of said adjusting means, for concurrently changing the volume flow rate of high volume low pressure air at said body passage outlet by an amount correlated to the change in the flow rate of air through said inlet to said side port orifices, so that a change in the flow rate of air through said inlet to said side port orifices does not significantly change the pressure of air at said atomizing air orifice.]

[27. Apparatus as in claim 26, said converting means including a restriction in said body passage, the low volume high pressure air at said body passage inlet flowing through said restriction and being converted to high volume low pressure air at said body passage outlet, and said changing means comprising means for changing the flow rate of air through said restriction.]

[28. Apparatus as in claim 27, including a valve member common to each of said adjusting means and said changing means for simultaneously changing the flow rate of air through each of said inlet to said side port air orifices and said restriction.]

[29. Apparatus as in claim 28, said valve member comprising a valve stem extended through said body passage and through said restriction and longitudinally movable therein, said valve stem having a forward end for movement toward and away from said inlet to said side port orifices to control the air flow area through said inlet to said side port orifices, said valve stem also having a changed diameter portion cooperable with said restriction, and means for moving said valve stem longitudinally to move said forward end toward and away from said inlet to said side port orifices and to simultaneously move said changed diameter portion relative to said restriction, so that said valve stem simultaneously controls the flow rate of air through each of said inlet to said side port orifices and through said restriction.]

[30. A spray gun for atomizing liquid coating material, comprising a spray gun body having an air passage extending between an inlet to and an outlet from said passage; a spray head carried on said body, said spray head having a fluid orifice, an atomizing air orifice having an inlet thereto and side port air orifices having an inlet thereto, said inlets being in communication with said body passage outlet; a restriction in said body passage, said restriction having an air flow passage therethrough; a single valve member for simultaneously adjusting the resistance to a flow of air through said restriction and the resistance to a flow of air through said inlet to said side port orifices; means for delivering liquid coating material to said spray head fluid orifice for emission therefrom; means for supplying low volume high pressure air to said body passage inlet for flow through said restriction to said body passage outlet, said restriction converting the low volume high pressure air at said body passage inlet to high volume low pressure air at said body passage outlet for flow through said spray head inlets to said atomizing air orifice to atomize the coating material into a spray and to said side port orifices for impingement against and to shape the spray; and means for operating said valve member to simultaneously adjust the resistance to a flow of air through said restriction and the resistance to a flow of air through said inlet to said side port orifices, such that the resistances either simultaneously increase or decrease by amounts such that, upon a change in the resistance to a flow of air through said inlet to said side port orifices to change the shape of the spray, the volume flow rate of air through said inlet to said atomizing air orifice does not change by an amount that significantly changes the pressure of air at said atomizing air orifice.]

[31. A spray gun as in claim 30, wherein said supplying means supplies air at a pressure of up to about 100 psi at said body passage inlet, and said restriction, valve member and means for operating said valve member limit the pressure of air at said atomizing air and side port orifices to be no greater than about 10 psi, irrespective of changes in the resistance to a flow of air through said inlet to said side port orifices.]

[32. A spray gun as in claim 30, wherein said restriction comprises a venturi and said valve member comprises a valve stem in said body passage and extending through said venturi, said valve stem having a forward end forming a valve with said inlet to said side port orifices and a body portion of changing diameter whereat said valve stem extends through said venturi, and including means for moving said valve stem to simultaneously change the air flow areas through each of said venturi and said inlet to said side port orifices.]

[33. A spray gun as in claim 32, wherein said means for delivering coating material comprises a paint cup and means for coupling air in said body passage downstream from said venturi to said cup to pressurize said cup for pressurized delivery of coating material to said fluid orifice.]

[34. A spray gun as in claim 33, including means for preventing said valve stem forward end from completely closing the air flow area through said inlet to said side port orifices to prevent an excessive pressure of air from being developed in said body passage downstream from said venturi to thereby prevent overpressurization of said paint cup.]

35. A method of spraying liquid coating material, comprising the steps of providing liquid coating material to a fluid orifice in a spray head for emission therefrom; supplying air to an air supply passage for the spray head; [delivering air] *providing in the spray head at and downstream from the outlet of the passage an atomizing air orifice and shaping air orifices of large cross-sectional flow area for accommodating passageway through and emission therefrom of a high volume of low pressure air; delivering air at low pressure and high volume* from the air supply passage to [an] *the* atomizing air orifice in the spray head to atomize the emitted coating material into a spray; selectively delivering air from the air supply passage to *the* shaping air orifices in the spray head for impingement against and to shape the spray; adjusting the volume flow rate of air delivered to the shaping air orifices to adjust the shape of the spray; and, in response to and concurrently with performance of said adjusting step, correspondingly adjustably controlling the volume flow rate of air through the air supply passage to prevent the pressure of air at the spray head from exceeding a selected maximum pressure as a result of changes in the volume flow rate of air delivered to the shaping air orifices, *wherein said delivering step provides air at a pressure no greater than about 10 psi at the atomizing air orifice, and said correspondingly adjustably controlling step decreases the volume flow rate of air through the air supply passage to prevent the pressure of air at the atomizing air orifice from exceeding about 10 psi upon a decrease in the volume flow rate of air delivered to the shaping air orifices.*

[36. A method as in claim 35, wherein said adjusting and correspondingly adjustably controlling steps comprise using a single valve member to decrease and increase the volume flow rate of air through the air supply passage simultaneously with and by an amount corresponding to decreases and increase in the volume flow rate of air delivered to the shaping air orifices.]

[37. A method as in claim 35, wherein said supplying and delivering steps provide air at a pressure no greater than about 10 psi at the atomizing air orifice, and said correspondingly adjustably controlling step decreases the volume flow rate of air through the air supply passage to prevent the pressure of air at the atomizing air orifice from exceeding 10 psi upon a decrease in the volume flow rate of air delivered to the shaping air orifices.]

38. A method of spraying liquid coating material with a spray head having a fluid orifice, a first passageway extending to an atomizing air orifice and a second passageway extending to shaping air orifices, comprising the steps of delivering liquid coating material to the fluid orifice for emission therefrom; supplying air through a common passageway to the spray head; [delivering air supplied to the spray head] *providing in the spray head at and downstream from the outlet of the passage an atomizing air orifice and shaping air orifices of large cross-sectional flow area for accommodating passage through and emission therefrom of a high volume of low pressure air; delivering air at high pressure and low volume to the common passageway on the upstream side of a restriction therein so that air exiting the downstream side of the restriction has a high volume and a low pressure no greater than about 10 psi; delivering the high volume low pressure air* through the first passageway to the atomizing air orifice to atomize the emitted coating material into a spray; selectively delivering [air supplied to the spray head] *the high volume low pressure air* through the second passageway to the shaping air orifices for impingement against and to shape the spray; adjusting the air flow area through the second passageway to control the volume flow rate of air delivered to the shaping air orifices to adjust the shape of the spray; and, in response to and concurrently with performance of said adjusting step, correspondingly varying the air flow area through the common passageway to change the volume flow rate of air supplied to the spray head to prevent the pressure of air at the spray head from exceeding [a selected maximum pressure] *about 10 psi* as a result of changes in the volume flow rate of air delivered to the shaping air orifices.

[39. A method as in claim 38, wherein said adjusting and correspondingly varying steps comprise using a single valve member to simultaneously change the air flow area through the second passageway and vary the air flow area through the common passageway.]

[40. A method as in claim 38, wherein said supplying step comprises supplying air through a restriction in the common passageway, and said varying step comprises changing the air flow area through the restriction by an amount correlated to a change in the air flow area through the second passageway.]

[41. A method as in claim 38, wherein said adjusting and correspondingly varying steps comprise using a single valve member to simultaneously change the air flow area through the second passageway and vary the air flow area through the restriction.]

[42. A method as in claim 40, wherein said supplying step comprises delivering air at a high pressure and low volume to the common passageway on the upstream side of the restriction, and said correspondingly varying step comprises varying the air flow area through the restriction so that air exiting the downstream side of the restriction has, with respect to air on its upstream side, a high volume and low pressure and so that the pressure of air at the spray head is no greater than the selected maximum pressure.]

[43. A method as in claim 42, wherein the restriction is a venturi an said step of delivering liquid coating material comprises pressurizing a paint cup with air obtained from the common passageway on the downstream side of the venturi, and flowing the paint from the pressurized cup to the fluid orifice.]

[44. A method as in claim 40, wherein said supplying step comprises delivering air at a pressure up to about 100 psi to the common passageway on the upstream side of the restriction, and said correspondingly varying step comprises varying the air flow area through the restriction so that the pressure of air at the spray head is no greater than about 10 psi, irrespective of the volume flow rate of air delivered to the shaping air orifices.]

45. A method of spraying liquid coating material with an apparatus having a body and a spray head carried by the body, comprising the steps of delivering liquid coating material *at a substantially constant flow rate* to a fluid orifice in the spray head for emission therefrom; supplying air at a low volume and high pressure to an inlet to a passage in the body; converting the low volume high pressure air at the body passage inlet to high volume low pressure air at an outlet from the body passage; connecting the air at the outlet from the body passage to the spray head; *providing in the spray head at and downstream from the outlet of the passageway an atomizing air orifice and shaping air orifices of large cross-sectional flow area for accommodating passage through and emission therefrom of a high volume of low pressure air;* delivering the air connected to the spray head to [an] *the* atomizing air orifice and shaping air orifices in the spray head for flow of high volume low pressure air through the atomizing air orifice to atomize the emitted coating material into a spray and through the shaping air orifices for impingement against and to shape the spray; adjusting the volume flow rate of air delivered to the shaping air orifices to adjust the shape of the spray; and, in response to and concurrently with performance of said adjusting step, correspondingly changing the volume flow rate of high volume low pressure air connected to the spray head from the body passage outlet to prevent the pressure of air at the spray head from exceeding [a selected maximum pressure] *about 10 psi* as a result of changes in the flow rate of air delivered to the shaping air orifices.

46. A method as in claim 45, wherein said correspondingly changing step decreases and increases the volume flow rate of high volume low pressure air connected to the spray head by an amount correlated to respective decreases and increases in the volume flow rate of air delivered to the shaping air orifices.

[47. A method as in claim 45, wherein said converting step comprises flowing the low volume high pressure air through a restriction in the body passage, and said correspondingly changing step comprises changing the resistance to a flow of air through the restriction.]

[48. A method as in claim 45, wherein air connected to the spray head is delivered to the shaping air orifices through an air flow path and said adjusting and correspondingly changing steps are performed using a common valve member for simultaneously changing the resistance to a flow of air through each of the air flow path and the body passage.]

[49. Apparatus for spray coating, comprising a spray head having a fluid orifice, an atomizing air orifice and shaping air orifices; means for providing liquid coating material to said fluid orifice for emission therefrom; air supply passage means for supplying air to said spray head; means for delivering air from said air supply passage means to said atomizing air orifice to atomize emitted coating liquid into a spray; means for selectively delivering air from said air supply passage means to said shaping air orifices for impingement against and to shape the spray; means for adjusting the volume flow rate of air delivered to said shaping air orifices to adjust the shape of the spray; and means, responsive to operation of said adjusting means, for concurrently and correspondingly adjustably controlling the volume flow rate of air through said air supply passage means to prevent the pressure of air at said spray head from exceeding a selected maximum pressure as a result of changes in the volume flow rate of air delivered to said shaping air orifices.]

[50. Apparatus as in claim 49, wherein said air supply passage means and said delivering means deliver air to said atomizing air orifice at a pressure no greater than about 10 psi, and said correspondingly adjustably controlling means decreases the volume flow rate of air through said air supply passage means to prevent the pressure of air at said atomizing air orifice from exceeding 10 psi in response to said adjusting means decreasing the volume flow rate of air delivered to said shaping air orifices.]

[51. Apparatus for spray coating, comprising a spray head having a fluid orifice, first passageway means extending to an atomizing air orifice and second passageway means extending to shaping air orifices; means for delivering liquid coating material to said fluid orifice for emission therefrom; means for supplying air through a common air passageway means to said spray head for delivery through said first passageway means to said atomizing air orifice to atomize emitted coating material into a spray and through said second passageway means to said shaping air orifices for impingement against and to shape the spray; means for adjusting the air flow area through said second passageway means to control the volume flow rate of air to said shaping air orifices to adjust the shape of the spray; and means, responsive to operation of said adjusting means, for concurrently and correspondingly changing the air flow area through said common passageway means to change the volume flow rate of air supplied to said spray head so that the pressure of air at said spray head does not exceed a selected maximum pressure as a result of changes in the volume flow rate of air delivered to said shaping air orifices.]

[52. Apparatus as in claim 51, including a restriction in said common passageway means, and wherein said supplying means supplies air through said restriction to said spray head and said correspondingly changing means changes the air flow area through said restriction by an amount correlated to a change in the air flow area through said second passageway means.]

[53. Apparatus as in claim 51, including valve means common to each of said adjusting means and said correspondingly changing means for simultaneously changing the air flow areas through each of said second passageway means and said common passageway means.]

[54. Apparatus as in claim 52, wherein said restriction comprises a venturi, said supplying means delivers air at a low volume and high pressure to said common passageway means on the upstream side of said venturi, and said correspondingly changing means changes the air flow area through said venturi so that air exiting the downstream side of said venturi has, with respect to air on its upstream side, a high volume and low pressure and also so that the pressure of air at said spray head is no greater than said selected maximum pressure.]

[55. Apparatus as in claim 52, wherein said delivering means includes a paint cup and means for coupling air on the downstream side of said restriction to said paint cup to pressurize said cup for pressurized delivery of coating material to said fluid orifice.]

[56. Apparatus as in claim 52, wherein said supplying means delivers air at a pressure up to about 100 psi to said common passageway means on the upstream side of said restriction, and said correspondingly changing means changes the air flow area through said restriction so that the pressure of air at said spray head is no greater than about 10 psi, irrespective of the volume flow rate of air to said shaping air orifices.]

[57. Apparatus for spray coating, comprising a body having an air passage therethrough; a spray head carried by said body, said spray head having a fluid orifice, an atomizing air orifice and shaping air orifices; means for delivering liquid coating material to said spray head fluid orifice for emission therefrom; means for supplying air at a low volume and high pressure to an inlet to said body air passage; means for converting the low volume high pressure air at said body passage inlet to high volume low pressure air at an outlet from said body passage; means for connecting the high volume low pressure air at said body passage outlet to said spray head; means for delivering high volume low pressure air connected to said spray head to said atomizing air orifice and to said shaping air orifices for flow through said atomizing air orifice to atomize emitted coating liquid into a spray and through said shaping air orifices for impingement against and to shape the spray; means for adjusting the volume flow rate of air delivered to said shaping air orifices to adjust the shape of the spray; and means, responsive to operation of said adjusting means, for concurrently and correspondingly changing the volume flow rate of high volume low pressure air at said body air passage outlet to prevent the pressure of air at said spray head from exceeding a selected maximum pressure as a result of changes in the volume flow rate of air delivered to said shaping air orifices.]

[58. Apparatus as in claim 57, wherein said converting means includes a restriction in said body air passage, the low volume high pressure air supplied at said body passage inlet flows through said restriction and is converted to high volume low pressure air at said body passage outlet, and said correspondingly changing means changes the resistance to a flow of air through said restriction.]

[59. Apparatus as in claim 57, including valve means common to each of said adjusting means and said correspondingly changing means for simultaneously changing the volume flow rates of air delivereed to said shaping air orifices and from said body passage outlet.]

[60. Apparatus as in claim 58, wherein said spray head includes inlet means to said shaping air orifices, and including a valve stem extended through said body air passage and through said restriction and longitudinally movable therein, said valve stem having a forward end that is movable relative to said inlet means to control the resistance to a flow of air through said inlet means, said valve stem also having a portion cooperable with said restriction for controlling the resistance to a flow of air through said restriction, and including means for moving said valve stem to move said forward end relative to said inlet means and to simultaneously move said portion relative to said restriction, whereby said valve stem simultaneously controls the resistance to a flow of air through each of said inlet means and said restriction.]

[61. A spray gun for atomizing liquid coating material, comprising a spray gun body having an air passage extending between an inlet to and an outlet from said passage; a spray head carried on said body, said spray head having a fluid orifice, an atomizing air orifice having inlet means thereto and shaping air orifices having inlet means thereto, each said inlet means being in communication with said body passage outlet; a restriction in said body passage, said restriction having an air flow passage therethrough; valve means for simultaneously adjusting the resistance to a flow of air through each of said air flow passage in said restriction and said inlet means to said shaping air orifices; means for delivering liquid coating material to said spray head fluid orifice for emission therefrom; means for supplying low volume high pressure air to said body air passage inlet for flow through said restriction to said air passage outlet, said restriction converting the low volume high pressure air at said body air passage inlet to high volume low pressure air at said body air passage outlet for flow through each of said spray head inlet means to and through said atomizing air orifice to atomize emitted coating material into a spray and to and through said shaping air orifices for impingement against and to shape the spray; and means for operating said valve means to simultaneously adjust the resistance to a flow of air through each of said restriction air flow passage and said inlet means to said shaping air orifices, such that the resistances to a flow of air simultaneously either increases or decreases.]

[62. A spray gun as in claim 61, wherein said supplying means supplies air at a pressure up to about 100 psi at said body passage inlet, and said restriction and valve means limit the pressure of air at said spray head to be no greater than about 10 psi, irrespective of changes in the resistance to a flow of air through said inlet means to said shaping air orifices.]

[63. A spray gun as in claim 61, wherein said restriction comprises a venturi and said valve means comprises a valve stem in said body air passage and extending through said venturi, said valve stem having a forward end forming a valve with said inlet means to said shaping air orifices and a body portion of changing diameter within said venturi, and including means for moving said valve stem to simultaneously change the air flow areas through each of said venturi and said inlet means to said shaping air orifices.]

[64. A spray gun as in claim 61, wherein said means for delivering coating material comprises a paint cup and means for coupling air in said body passage downstream from said restriction to said cup to pressurize said cup for pressurized delivery of coating material to said fluid orifice.]

* * * * *